United States Patent
Henry et al.

(10) Patent No.: US 12,469,083 B1
(45) Date of Patent: Nov. 11, 2025

(54) SYSTEMS AND METHODS FOR PREDICTED TOTAL LOSS DETERMINATIONS BASED ON IMAGE ANALYSIS

(71) Applicant: Allstate Insurance Company, Northbrook, IL (US)

(72) Inventors: Michael Bradley Henry, Northbrook, IL (US); Patrick Figliozzi, Northbrook, IL (US); Anna Varentsova, Northbrook, IL (US); Chris Jonas, Northbrook, IL (US); John LaVanne, Northbrook, IL (US); Ann Rebecca Wei, Northbrook, IL (US); Cory Campagna, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 303 days.

(21) Appl. No.: 17/178,847

(22) Filed: Feb. 18, 2021

Related U.S. Application Data

(60) Provisional application No. 62/978,432, filed on Feb. 19, 2020.

(51) Int. Cl.
*G06Q 40/08* (2012.01)
*G06F 18/22* (2023.01)
(Continued)

(52) U.S. Cl.
CPC ............. *G06Q 40/08* (2013.01); *G06F 18/22* (2023.01); *G06N 3/04* (2013.01); *G06N 3/08* (2013.01); *G06Q 10/10* (2013.01); *G06Q 30/0278* (2013.01); *G06T 7/0002* (2013.01); *G06Q 10/20* (2013.01); *G06T 2207/20084* (2013.01); *G06V 2201/08* (2022.01)

(58) Field of Classification Search
None
See application file for complete search history.

(56) References Cited

U.S. PATENT DOCUMENTS

| 9,990,661 B2 | 6/2018 | Taylor |
| 10,013,718 B1 | 7/2018 | Leise |

(Continued)

FOREIGN PATENT DOCUMENTS

| CN | 106600421 A | 4/2017 |
| CN | 109344819 A | 2/2019 |

(Continued)

OTHER PUBLICATIONS

Insurance Innovation Reporter, Ccc Introduces AI-Powered Single-Photo Vehicle Loss Prediction Solution, (https://iireporter.com/ccc-introduces-ai-powered-single-photo-vehicle-loss-prediction-solution/ ), Oct. 16, 2017, 5 pgs.

*Primary Examiner* — William J Jacob
(74) *Attorney, Agent, or Firm* — Dinsmore & Shohl LLP

(57) ABSTRACT

Intelligent prediction systems and methods of use to analyze one or more uploaded and labeled images to generate one or more processed images via a data analytics module, determine an identified property type from the processed images, generate a match between the identified property type and a reported property type associated with a claim identifier and a total loss score, and generate an automated predicted total loss determination based on the total loss score, the one or more processed images from the data analytics module, and the match.

18 Claims, 4 Drawing Sheets

(51) Int. Cl.
  *G06N 3/04*    (2023.01)
  *G06N 3/08*    (2023.01)
  *G06Q 10/10*   (2023.01)
  *G06Q 30/02*   (2023.01)
  *G06T 7/00*    (2017.01)
  *G06Q 10/20*   (2023.01)

(56) References Cited

U.S. PATENT DOCUMENTS

| | | | |
|---|---|---|---|
| 10,055,793 | B1 | 8/2018 | Call et al. |
| 10,332,209 | B1 | 6/2019 | Brandmaier et al. |
| 10,360,601 | B1 | 7/2019 | Adegan |
| 10,380,696 | B1 * | 8/2019 | Haller, Jr. ............... G06K 9/00 |
| 2018/0260793 | A1 | 9/2018 | Li et al. |
| 2018/0293552 | A1 | 10/2018 | Zhang et al. |
| 2018/0293664 | A1 | 10/2018 | Zhang et al. |
| 2020/0349370 | A1 * | 11/2020 | Lambert .................. G06T 7/75 |
| 2022/0187847 | A1 * | 6/2022 | Cella .................. G05B 19/4155 |
| 2022/0245574 | A1 * | 8/2022 | Cella ...................... G06F 9/451 |

FOREIGN PATENT DOCUMENTS

| | | | |
|---|---|---|---|
| JP | 2002183338 A | | 6/2002 |
| WO | 2018196815 A1 | | 11/2018 |

* cited by examiner

SYSTEMS AND METHODS FOR PREDICTED TOTAL LOSS DETERMINATIONS BASED ON IMAGE ANALYSIS

CROSS REFERENCED TO RELATED APPLICATIONS

The present disclosure claims the benefit of U.S. Provisional Application No. 62/978,432, filed Feb. 19, 2020, entitled "SYSTEMS AND METHODS FOR PREDICTED TOTAL LOSS DETERMINATIONS BASED ON IMAGE ANALYSIS." the entirety of which is incorporated by referenced herein.

TECHNICAL FIELD

The present disclosure relates to total loss prediction solutions and, in particular, systems and methods for automated predicted total loss determinations of property based on image analysis and property identification.

BACKGROUND

Insurance companies tend to generate estimates for property damage, such as home or vehicle damage, based on a manual process in which human specialists and adjusters review submitted images and information for a damaged property claim to generate an estimate. The estimate may result in a repair estimate or a total loss estimate.

BRIEF SUMMARY

According to the subject matter of the present disclosure, an intelligent prediction system may include one or more processors, one or more memory components communicatively coupled to the one or more processors, and machine readable instructions stored in the one or more memory components. The machine readable instructions may cause the intelligent prediction system to perform at least the following when executed by the one or more processors: receive from a user one or more uploaded and labeled images of at least a property and a claim identifier associated with the property; retrieve information based on the claim identifier, wherein the information comprises a total loss score of the property and a reported property type of the property; analyze the one or more uploaded and labeled images to generate one or more processed images via a data analytics module; and determine an identified property type of the property from the one or more processed images. The machine readable instructions may further cause the intelligent prediction system to perform at least the following when executed by the one or more processors: generate a property match indication between the identified property type determined from the one or more processed images and the reported property type associated with the claim identifier when there is a match therebetween; and generate an automated predicted total loss determination based on the total loss score, the one or more processed images from the data analytics module, and the property match indication.

According to another embodiment of the present disclosure, a method of implementing an intelligent prediction system to automatically generate a total loss prediction may include receiving from a user one or more uploaded and labeled images of at least a property and a claim identifier associated with the property, retrieving information based on the claim identifier, wherein the information comprises a total loss score of the property and a reported property type of the property, analyzing the one or more uploaded and labeled images to generate one or more processed images via a data analytics module, and determining an identified property type of the property from the one or more processed images. The method may further include generating a property match indication between the identified property type determined from the one or more processed images and the reported property type associated with the claim identifier when there is a match therebetween, and generating an automated predicted total loss determination based on the total loss score, the one or more processed images from the data analytics module, and the property match indication.

According to yet another embodiment of the present disclosure, a method of implementing an intelligent prediction system to automatically generate a total loss prediction may include receiving from a user one or more uploaded and labeled images of at least a vehicle that is an automotive vehicle and a claim identifier associated with the vehicle, retrieving information based on the claim identifier, wherein the information comprises a total loss score of the vehicle and a reported vehicle type of the vehicle, analyzing the one or more uploaded and labeled images to generate one or more processed images via a data analytics module, and determining an identified vehicle type of the vehicle from the one or more processed images. The method may further include generating a vehicle match indication between the identified vehicle type determined from the one or more processed images and the reported vehicle type associated with the claim identifier when there is a match therebetween, and generating an automated predicted total loss determination based on the total loss score, the one or more processed images from the data analytics module, and the vehicle match indication.

Although the concepts of the present disclosure are described herein with primary reference to a property damage prediction solution of insured property, it is contemplated that the concepts will enjoy applicability to any setting for purposes of intelligent prediction solutions, such as alternative business settings or otherwise, including and not limited to, non-insured property and/or any service type request, such as through voice, digital, online, or other transmission technologies.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In embodiments described herein, an intelligent prediction module is configured to implement systems and methods to generate an automated predicted total loss determination, as described in greater detail below. A property that is damaged may be determined to be a total loss if a repair cost for the damaged property exceeds a value of the property. In an embodiment, a property that is damaged may be determined to be a total loss if the repair cost for the damaged property is close enough to and within a threshold range of the value of the property. Further, prediction of total loss may be based on a historical total loss determination of similar events, which may be stored in a database. Embodiments of the present disclosure are directed to an intelligent prediction system, as described in greater detail further below, to utilize an electronic application tool to receive uploaded and optionally labeled photographic images and/or video associated with property and damage to the property, along with a claim identifier, and to retrieve information based on the claim identifier. The intelligent prediction system may then use the information along with photo analytics run on the one or more images to match an identified property type as determined from the one or more images with a reported property type associated with the claim identifier, and to generate an automated predicted total loss determination based on the information, photo analytics, and the property match. In an embodiment, the property may be an automotive vehicle involved in an accident and may belong to either an insured party or a claimant of an insurance claim.

Figure 1:
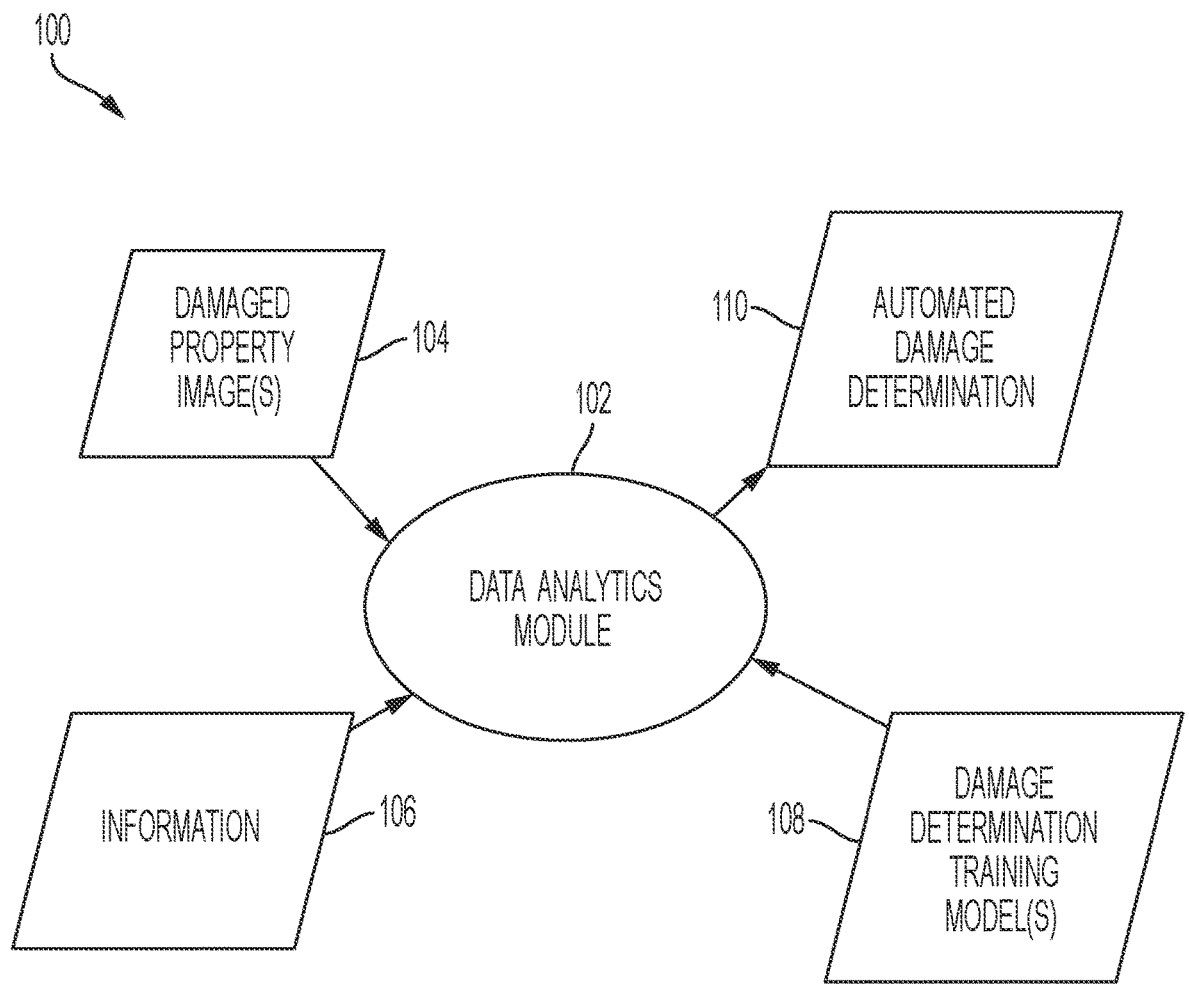
FIG. 1 illustrates an intelligent prediction solution utilizing data analytics module, according to one or more embodiments shown and described herein.

Referring to FIG. 1, an intelligent prediction solution 100 utilizes a data analytics module 102 to automatically generate one or more estimates for property damage of a property 151 (FIG. 2) based on processing of images of the property damage. In embodiments, the property 151 may be a vehicle, a housing unit, a commercial building unit, a rental unit, a boat, or other like property owned by a user. The vehicle may be an automotive vehicle such as a car, truck, or other like road-based vehicle. Various inputs are received by the data analytics module 102 to output an associated property damage estimate. For example, one or more images 104 of damaged property are input in the data analytics module along with information 106 about the owner and/or user of the damaged property. Such information 106 may include information associated with a claim for the property damage, such as a claim identifier, and other information associated with the property owner and/or user of the intelligent prediction solution 100.

One or more damage determination training models 108 trained on image training sets to generate damage predictions may be used. With reference to the use of training or trained herein, it is to be understood that, in an embodiment, a model object is trained or configured to be trained and used for data analytics as described herein and includes a collection of training data sets based on images such as photographs (e.g., photos) placed within the model object. The data analytics module 102 applies a photo analytics model on the one or more images 104 of damaged property and information 106 about the owner and/or user using the one or more damage determination training models 108 to generate the automated damage determination 110.

The data analytics module 102 may be communicatively coupled to a "big data" environment including a database configured to store and process large volumes of data in such an environment. The database may be, for example, a structured query language (SQL) database or a like database that may be associated with a relational database management system (RDBMS) and/or an object-relational database management system (ORDBMS). The database may be any other large-scale storage and retrieval mechanism including, but not limited to, a SQL, SQL including, or a non-SQL database. For example, the database may utilize one or more big data storage computer architecture solutions. Such big data storage solutions may support large data sets in a hyperscale and/or distributed computing environment, which may, for example, include a variety of servers utilizing direct-attached storage (DAS). Such database environments may include Hadoop, NoSQL, and CASSANDRA that may be usable as analytics engines. Thus, while SQL may be referenced herein as an example database that is used with the tool described herein, it is understood that any other such type of database capable of supporting large amounts of database, whether currently available or yet-to-be developed, and as understood to those of ordinary skill in the art, may be utilized with the tool described herein as well.

Figure 2:
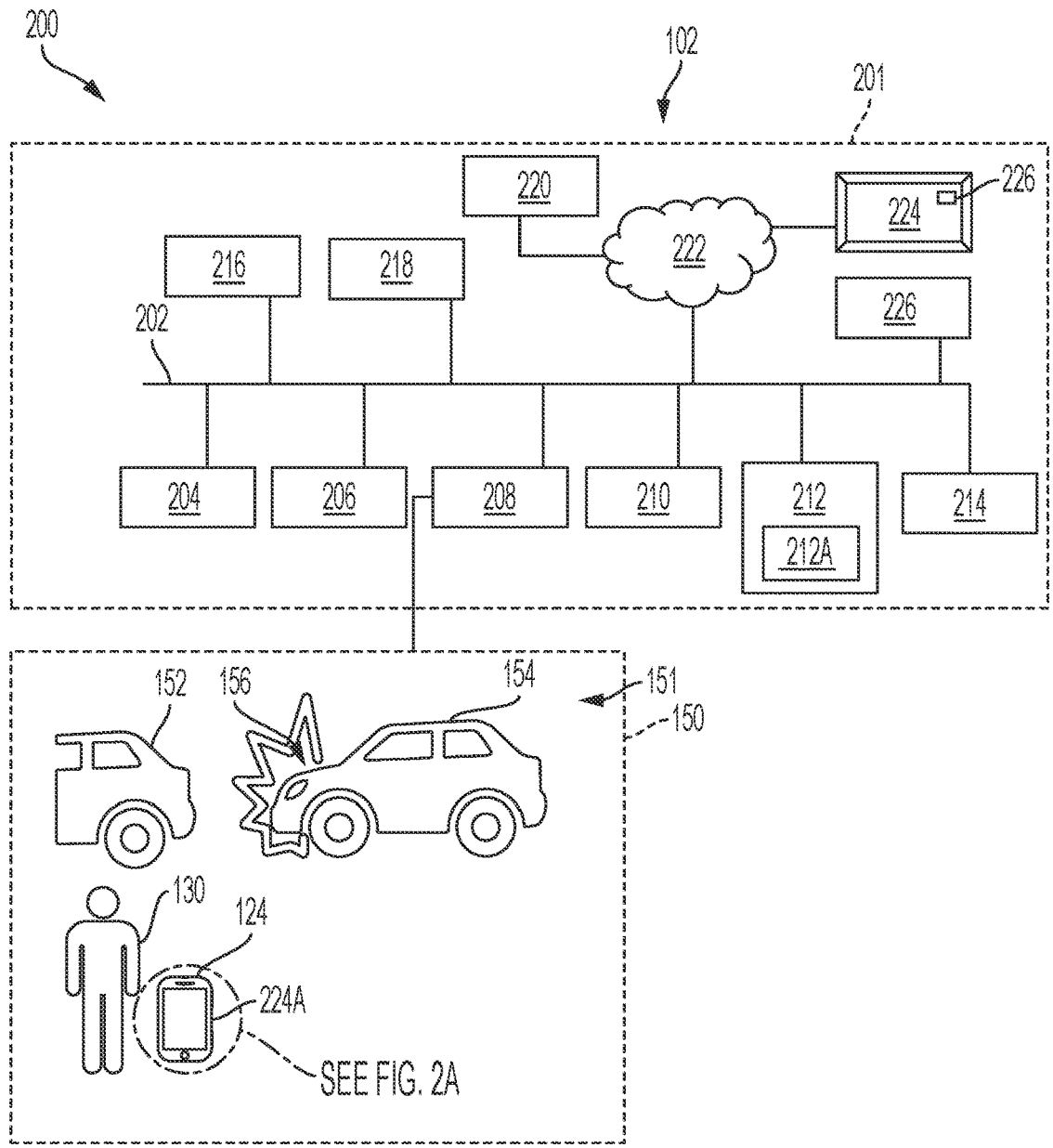
FIG. 2 illustrates a computer implemented system including an intelligent prediction module and for use with the process flows described herein and the intelligent prediction solution of FIG. 1, according to one or more embodiments shown and described herein.

FIG. 2 illustrates a computer implemented intelligent prediction system 200 for use with the processes described herein, such as process 400 of FIG. 4 described in greater detail below. Referring to FIG. 2, a non-transitory, intelligent prediction system 200 is configured for implementing a computer and software-based method, such as directed by the intelligent prediction solution 100 and the processes described herein, to automatically generate a property damage estimation as described herein. The intelligent prediction system 200 comprises an intelligent prediction module 201 as a component of the data analytics module 102 of FIG. 1 to generate the automated damage determination 110. The intelligent prediction system 200 further comprises a communication path 202, one or more processors 204, a non-transitory memory component 206, an image capture module 208 to receive one or more captured images, a claim generation platform 210, an image analytics module 212, an training module 212A of the image analytics module 212, a storage or database 214, a machine learning module 216, a network interface hardware 218, a network 222, a server 220, and a computing device 224. The various components of the intelligent prediction system 200 and the interaction thereof will be described in detail below. The image capture module 208 is configured to receive one or more images of the property damage, such as from a crash site 150. The images may be initially captured and transmitted by a user 130 through a camera 124 on a computer device 224, such as a smartphone 224A, including an application tool 226.

Figure 2A:
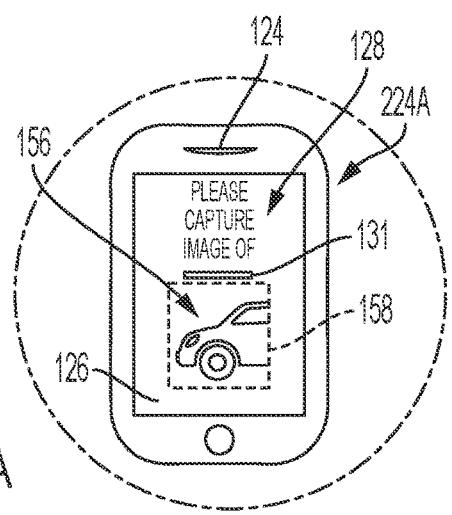
FIG. 2A illustrates a screen view for a smart mobile device of the intelligent prediction system of FIG. 2 that is configured to capture an image of damaged property, according to one or more embodiments shown and described herein.

As shown in FIG. 2A, the user 130 may capture one or more images of property damage at the crash site 150, such as including, but not limited to, photographs of vehicles 152, 154 involved in the crash and resulting property damage 156. In an embodiment, the computing device 224 may be used to upload captured images to the intelligent prediction system 200, such as through a web-link or smart device upload. By way of example, and not as a limitation, the smartphone 224A may be used to capture one or more images 104 through use of a graphical user interface (GUI) screen 126 and the camera 124. The GUI screen 126 may include a portion with a request 128 to capture an image per an instruction 131, such as of a driver side portion of the vehicle 154 including property damage 156 within a screen capture frame 158. Additionally or alternatively, a user may upload the one or more images 104 without such instructed guidance. The property damage 156 may include areas of damage and one or more damages parts of a vehicle 154, which may be associated with the user 130. The user 130 may upload the images to the image capture module 208 through the application tool 226, such as an application on the smartphone 224A or through a web-based link. In embodiments, captured images may additionally be of non-property damage such as of injuries sustained with respect to a damage event, and the uploaded images may be filtered to remove such non-property damage images and/or other images unrelated for total loss prediction purposes, as described in greater detail further below For instance, through the intelligent routing of the data analytics module 102 as described herein, such filtration may utilize only relevant photographs for total loss prediction purposes.

While only one server 220 and one computing device 224 is illustrated, the intelligent prediction system 200 can comprise multiple servers containing one or more applications and computing devices. In some embodiments, the intelligent prediction system 200 is implemented using a wide area network (WAN) or network 222, such as an intranet or the internet. The computing device 224 may include digital systems and other devices permitting connection to and navigation of the network. It is contemplated and within the scope of this disclosure that the computing device 224 may be a personal computer, a laptop device, a smart mobile device such as a smartphone or smart pad, or the like. Other intelligent prediction system 200 variations allowing for communication between various geographically diverse components are possible. The lines depicted in FIG. 2 indicate communication rather than physical connections between the various components.

The intelligent prediction system 200 comprises the communication path 202. The communication path 202 may be formed from any medium that is capable of transmitting a signal such as, for example, conductive wires, conductive traces, optical waveguides, or the like, or from a combination of mediums capable of transmitting signals. The communication path 202 communicatively couples the various components of the intelligent prediction system 200. As used herein, the term "communicatively coupled" means that coupled components are capable of exchanging data signals with one another such as, for example, electrical signals via conductive medium, electromagnetic signals via air, optical signals via optical waveguides, and the like.

The intelligent prediction system 200 of FIG. 2 also comprises the processor 204. The processor 204 can be any device capable of executing machine readable instructions. Accordingly, the processor 204 may be a controller, an integrated circuit, a microchip, a computer, or any other computing device. The processor 204 is communicatively coupled to the other components of the intelligent prediction system 200 by the communication path 202. Accordingly, the communication path 202 may communicatively couple any number of processors with one another, and allow the modules coupled to the communication path 202 to operate in a distributed computing environment. Specifically, each of the modules can operate as a node that may send and/or receive data.

The illustrated system 200 further comprises the memory component 206 which is coupled to the communication path 202 and communicatively coupled to the processor 204. The memory component 206 may be a non-transitory computer readable medium or non-transitory computer readable memory and may be configured as a nonvolatile computer readable medium. The memory component 206 may comprise RAM, ROM, flash memories, hard drives, or any device capable of storing machine readable instructions such that the machine readable instructions can be accessed and executed by the processor 204. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, as noted above, the intelligent prediction system 200 comprises the display such as a graphical user interface (GUI) on a screen of the computing device 224 for providing visual output such as, for example, information, graphical reports, messages, or a combination thereof. The display on the screen of the computing device 224 is coupled to the communication path 202 and communicatively coupled to the processor 204. Accordingly, the communication path 202 communicatively couples the display to other modules of the intelligent prediction system 200. The display can comprise any medium capable of transmitting an optical output such as, for example, a cathode ray tube, light emitting diodes, a liquid crystal display, a plasma display, or the like. Additionally, it is noted that the display or the computing device 224 can comprise at least one of the processor 204 and the memory component 206. While the intelligent prediction system 200 is illustrated as a single, integrated system in FIG. 2, in other embodiments, the systems can be independent systems.

The intelligent prediction system 200 comprises the image analytics module 212 and the machine learning module 216 as described above. The image analytics module 212 is configured to at least apply data analytics and artificial intelligence algorithms and models to received images, and such as photographic images. The machine learning module 216 is configured for providing such artificial intelligence algorithms and models, such as to the image analytics module 212. The machine learning module 216 may include an artificial intelligence component to train and provide machine learning capabilities to a neural network as described herein. By way of example, and not as a limitation, a convolutional neural network (CNN) may be utilized. The image analytics module 212, the training module 212A, and the machine learning module 216 are coupled to the communication path 202 and communicatively coupled to the processor 204. As will be described in further detail below, the processor 204 may process the input signals received from the system modules and/or extract information from such signals.

Data stored and manipulated in the intelligent prediction system 200 as described herein is utilized by the machine learning module 216, which is able to leverage a cloud computing-based network configuration such as the cloud to apply Machine Learning and Artificial Intelligence. This machine learning application may create models that can be applied by the intelligent prediction system 200, to make it more efficient and intelligent in execution. As an example and not a limitation, the machine learning module 216 may include artificial intelligence components selected from the group consisting of an artificial intelligence engine, Bayesian inference engine, and a decision-making engine, and may have an adaptive learning engine further comprising a deep neural network learning engine. It is contemplated and within the scope of this disclosure that the term "deep" with respect to the deep neural network learning engine is a term of art readily understood by one of ordinary skill in the art.

The intelligent prediction system 200 comprises the network interface hardware 218 for communicatively coupling the intelligent prediction system 200 with a computer network such as network 222. The network interface hardware 218 is coupled to the communication path 202 such that the communication path 202 communicatively couples the network interface hardware 218 to other modules of the intelligent prediction system 200. The network interface hardware 218 can be any device capable of transmitting and/or receiving data via a wireless network. Accordingly, the network interface hardware 218 can comprise a communication transceiver for sending and/or receiving data according to any wireless communication standard. For example, the network interface hardware 218 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 2, data from various applications running on computing device 224 can be provided from the computing device 224 to the intelligent prediction system 200 via the network interface hardware 218. The computing device 224 can be any device having hardware (e.g., chipsets, processors, memory, etc.) for communicatively coupling with the network interface hardware 218 and a network 222. Specifically, the computing device 224 can comprise an input device having an antenna for communicating over one or more of the wireless computer networks described above.

The network 222 can comprise any wired and/or wireless network such as, for example, wide area networks, metropolitan area networks, the internet, an intranet, satellite networks, or the like. Accordingly, the network 222 can be utilized as a wireless access point by the computing device 224 to access one or more servers (e.g., a server 220). The server 220 and any additional servers generally comprise processors, memory, and chipset for delivering resources via the network 222. Resources can include providing, for example, processing, storage, software, and information from the server 220 to the intelligent prediction system 200 via the network 222. Additionally, it is noted that the server 220 and any additional servers can share resources with one another over the network 222 such as, for example, via the wired portion of the network, the wireless portion of the network, or combinations thereof.

Figure 4:
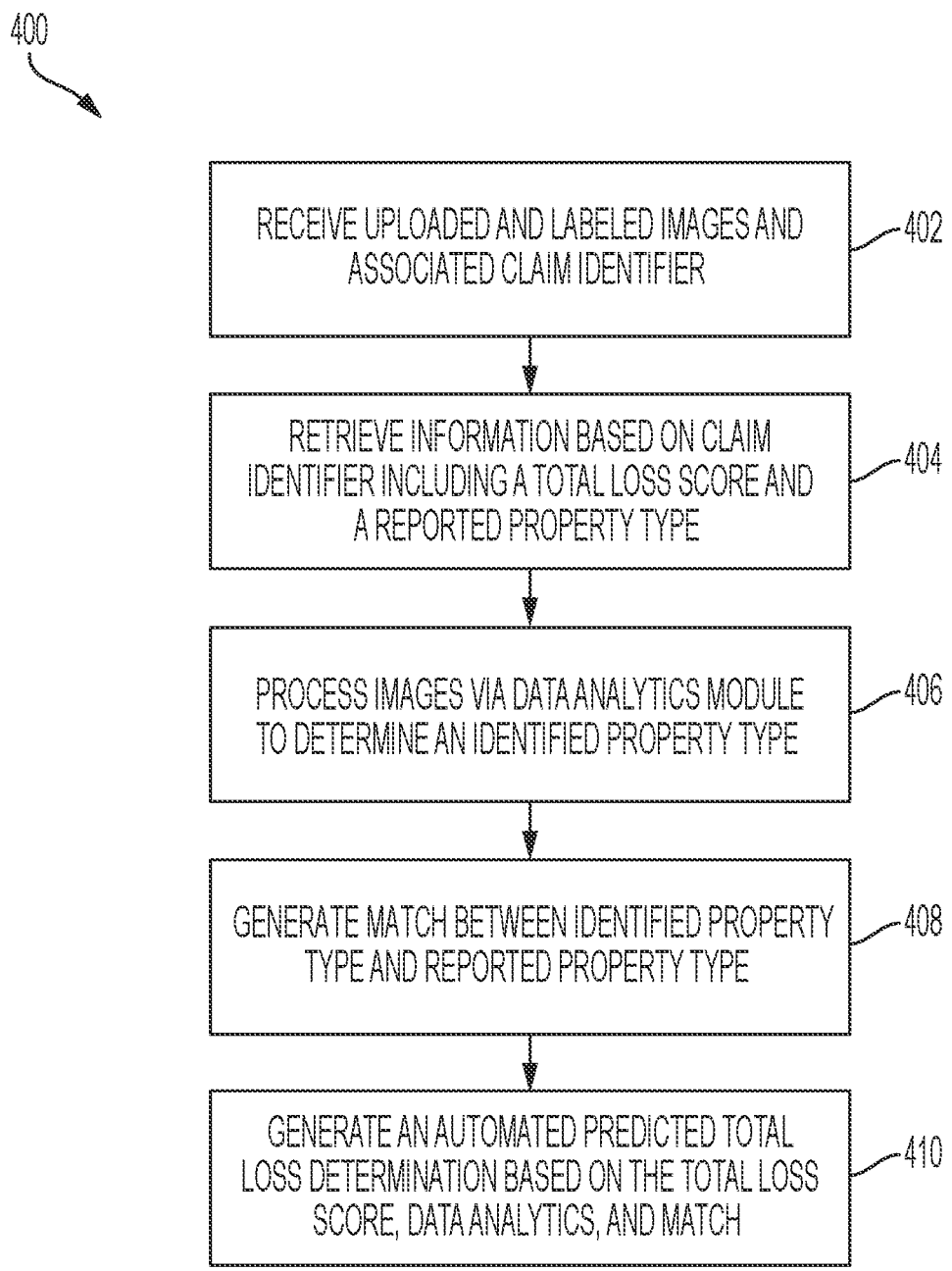
FIG. 4 illustrates a flowchart process for use of the intelligent prediction solution of FIG. 1 and intelligent prediction module and system of FIG. 2, according to one or more embodiments shown and described herein.

Referring to FIG. 4, a process 400 is shown for use with the training module 212A and the image analytics module 212 and the intelligent prediction system 200 of FIG. 2 to predict total loss determinations based on image analysis. In an embodiment, a user 130 may report a claim for a vehicle 154 owned by the user through a claim generation platform 210 to generate a claim number as a claim identifier. The user 130 may further provide further information about the claim through the claim generation platform 210 to associate with the claim identifier. For example, the user 130 may submit information about the crash site 150 such as number of vehicles included in an accident, other accident details, conditions of the vehicles involved, and the like. In embodiments, the claim generation platform 210 utilizes a structured data model to generate a total loss score based on the information associated with the generated claim identifier.

The intelligent prediction system 200 is configured to retrieve information about the associated user claim from the claim identifier to generate a total loss score for the vehicle 154 of the user 130 based on a structured data model and the information received through the claim generation platform 210 (e.g., the information 106 about the owner or user of the vehicle 154 as shown in FIG. 1). The intelligent prediction system 200 is further configured to receive photos from the user 130 (e.g., for a vehicle the user 130 may note as "non-drivable" when generating the claim identifier through the claim generational platform 210) through an application tool 226, such as an app on a smartphone, of a mobile client device or through another online platform such as a weblink. The user may label uploaded photos, such as with labels including, but not limited to, "my vehicle," "accident site," "vehicle interior," or "other vehicles." For example, a photo labeled as "other vehicles" may include the vehicle 154 of the user 130 along with one or more other vehicles 152.

Structured data may be provided from the claim generation platform 210. For instance, the total loss score may be generated from the structured data model and claim generation platform 210 and may then be used along with the result of photo analytics run by the image analytics module 212 on the submitted images to filter photos unrelated to vehicles and/or match a vehicle type identified from the images submitted through the application tool 226 with a customer vehicle type of the vehicle 154 of the user 130 reported in the claim generated by the claim generation platform 210 to further generate an automated predicted total loss determination.

In embodiments, the intelligent prediction system 200 may include a module 300 to receive one or more captured images 302, which captured images 302 may be labeled with a label 304 as described in greater detail further below. The one or more captured images 302 may be filtered through a filter 306 to output a selection of images for further processing as one or more usable filtered images 310 and to discard one or more determined unusable images 308 to improve processing. The one or more usable filtered images 310 may then be utilized for further image processing by the intelligent prediction system 200.

By way of example, and not as a limitation, in block 402 of the process 400 of FIG. 4, images uploaded and which may be labeled by the user 130 through such an application tool 226 are received by the intelligent prediction system 200 along with an associated claim identifier and generated through the claim generation platform 210. In block 404, information regarding structured data with respect to a claim and vehicle may be retrieved based on the claim identifier. As a non-limiting example, such information may be the total loss score and the customer vehicle type of the vehicle 154 of the user 130, which information is retrieved by the intelligent prediction system 200 based on the claim identifier.

In block 406, the uploaded images are processed via the image analytics module 212 of the data analytics module 102 to determine a vehicle type of the vehicle 154 identified in the one or more uploaded images as the vehicle 154 associated with the user 130. The vehicle type as determined by the image analytics module 212 is compared to the customer vehicle type of the vehicle 154 as retrieved by the intelligent prediction system 200 based on the claim identifier. In block 408, a vehicle match indication is generated between the vehicle type and the customer vehicle type when there is a match between the determined and identified vehicle type of the vehicle 154 from the images and the customer vehicle type of the vehicle 154 as retrieved based on the claim identifier. As a non-limiting example, the image analytics module 212 may identify the vehicle 154 as a type of a TOYOTA CAMRY or by the make of TOYOTA. The claim identifier may be associate with further information such as the customer vehicle type of a TOYOTA CAMRY or TOYOTA for the vehicle 154 and a total loss score associated with the vehicle 154. The match between the vehicle type of a TOYOTA CAMRY or TOYOTA for the vehicle 154 and the customer vehicle type of a TOYOTA CAMRY or TOYOTA for the vehicle 154 generates the vehicle match indication, and the total loss score is associated with the vehicle 154 from the processed uploaded images.

In block 410, an automated predicted total loss determination is generated based on the total loss score, data analytics from the image analytics module 212 and the data analytics module 102 overall, and the vehicle match indication. It is to be understood that reference to "based on" herein is indicative of the use of parameters that are utilized to provide the automated predicted loss determination, such that the automated predicted loss determination is a function of such parameters, and that a specific mathematical operation is not reference by use of the term "based on."

In embodiments described herein, the intelligent prediction system 200 is thus configured to instruct a user of an electronic application tool 226 to upload and optionally label one or more photos along with a claim identifier, as defined in block 402 of the process 400. The intelligent prediction system 200 is further configured to retrieve information based on the claim identifier including a total loss score generated based on the claim identifier and a customer vehicle type associated with the claim identifier, as set forth in block 404 of the process 400. The intelligent prediction system is configured to use the total loss score with photo analytics run in block 406 on the one or more images to match, in block 408, the vehicle type determined from the one or more images with the customer vehicle type associated with the claim identifier, and to generate in block 410 an automated predicted total loss determination based on the total loss score, photo analytics, and the vehicle match.

In an embodiment, the intelligent prediction system 200 may include machine readable instructions stored in a memory component 206 communicatively coupled to a processor 204. The machine readable instructions may cause the intelligent prediction system 200 to perform at least the following when executed by the processor 204: receive from a user 130 one or more captured images 302 as uploaded and labeled images of at least a property 151 and a claim identifier associated with the property 151. The one or more labeled images may be configured to be labeled based one or more pre-determined labels 304 comprising one of: "front," "rear," "driver side," "passenger side," and "not vehicle," Each labeled image including a pre-determined label of "not vehicle" is not processed to generate the one or more processed images. For example, an image of an odometer of a vehicle 154 would be labeled as "not vehicle," or may be labeled as "my vehicle interior," by the user 130 and would not be utilized for further total loss determination as unrelated to damage to the property 151 to save processing time and to present a more efficient system focusing on usable images for processing and analysis.

In embodiments, the one or more labeled images are configured to be labeled by module 300 of the intelligent prediction system 200 based one or more pre-determined classes, which may be one of "front," "rear," "driver side," "passenger side," "driver side front corner," "passenger side front corner," "driver side rear corner," "passenger side rear corner," "zoomed in," and "not vehicle." A user 130 may label the one or more images based on one or more pre-determined classes, such as "my vehicle exterior," "my vehicle interior," "other involved vehicles," "accident scene," and/or "my vehicle." When the one or more pre-determined classes is driver side front corner, the one or more pre-determined classes further includes a sub-class of front visible, driver side visible, or front and driver side visible. When the one or more pre-determined classes is passenger side front corner, the one or more pre-determined classes further includes a sub-class of front visible, passenger side visible, or front and passenger side visible. When the one or more pre-determined classes is driver side rear corner, the one or more pre-determined classes further includes a sub-class of rear visible, driver side visible, or rear and driver side visible. When the one or more pre-determined classes is passenger side rear corner, the one or more pre-determined classes further includes a sub-class of rear visible, passenger side visible, or rear and passenger side visible.

Figure 3:
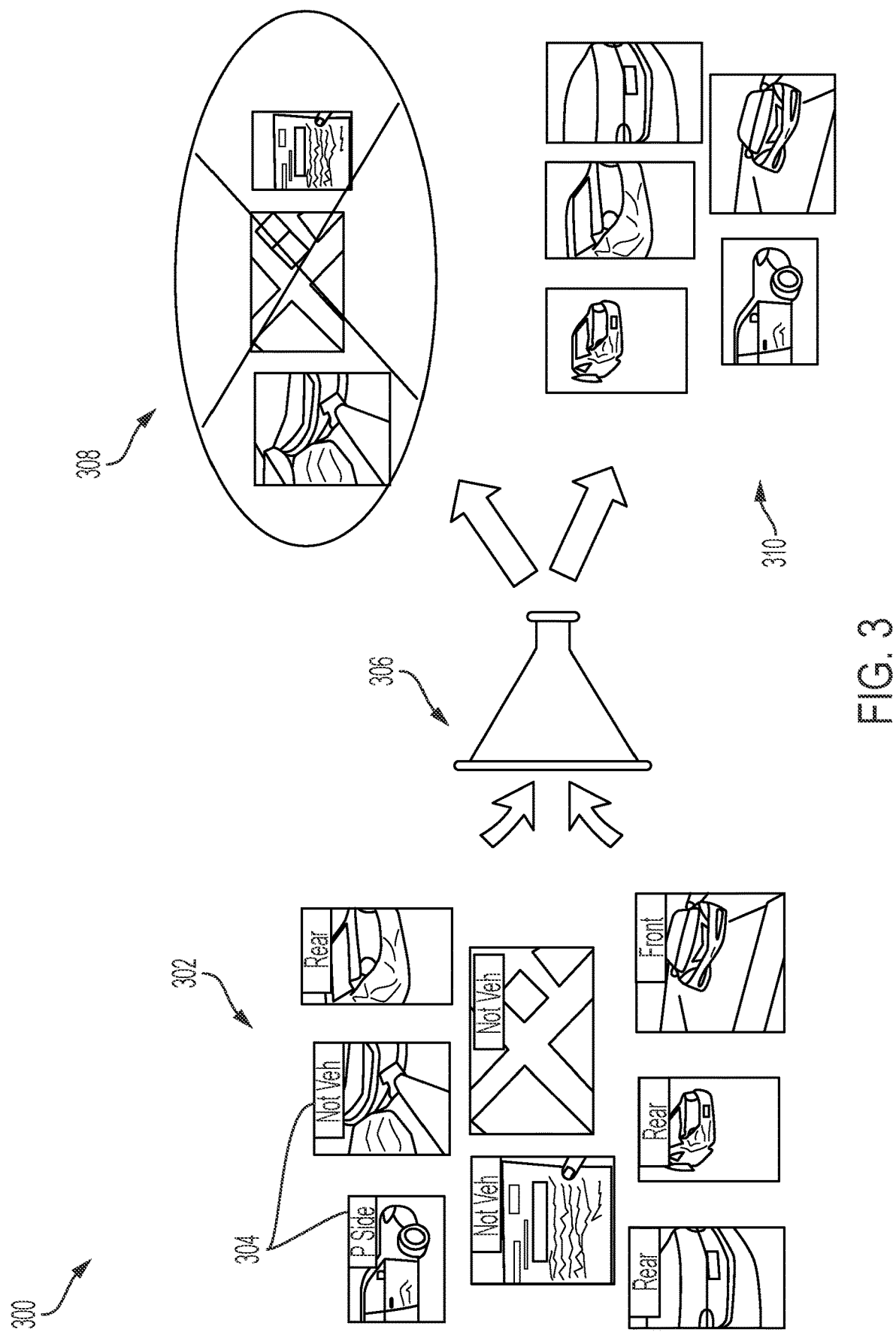
FIG. 3 illustrates a view of a plurality of captured images filtered to a selection of image for processing by the intelligent prediction system of FIG. 2, according to one or more embodiments shown and described herein.

The machine readable instructions may further cause the intelligent prediction system 200 to, when executed by the processor 204, filter the uploaded and potentially labeled images with a filter 306 (FIG. 3) to determine one or more usable filtered images 310, and analyze the one or more usable filtered images 310 to generate the one or more processed images via the data analytics module 102. As a non-limiting example, images with the label of "not vehicle" such as an image of a vehicle interior or odometer may be filtered out as an unusable image 308, and images of the vehicle may be retained as a usable image 310 for total loss determination. The uploaded and potentially labeled images may include non-property related images not relevant to total loss determinations that the intelligent prediction system 200 may filter out. Such non-property related images may be receipts, vehicle interior images, a vehicle odometer, digital map screen captures, or images of injuries to parties involved. Use of such images without filtration may add to the noise of the intelligent prediction system 200 and result in a weaker signal and/or less accurate digital signal. With reduction of such noise through filtration, the noise is reduced and a stronger signal produced with more efficient results, such as when the non-property related images are filtered out prior to image processing via the data analytics module 102. Such filtration is configured to isolate property related images of strong signal quality for efficient processing of images with stronger and/or more consistent signals.

The instructions may further be to retrieve information based on the claim identifier. Such information may include a total loss score of the property 151 and a reported property type of the property 151 already reported to and stored within the claim generation platform 210 or other component of the intelligent prediction system 200. Such information may further include damage details of the property 151 and an age of the property 151.

It is contemplated and within the scope of this disclosure that a neural network model may include, but not be limited to, and/or be communicatively coupled to non-neural network model components for further processing by the neural network model. The instructions may further be to analyze the one or more uploaded images to generate one or more processed images via a data analytics module 102 and to determine an identified property type of the property 151 from the one or more processed images. A property match indication may be generated between the identified property type determined from the one or more processed images and the reported property type associated with the claim identifier when there is a match therebetween.

The property may include a vehicle, such that the reported property type is a reported vehicle type, the identified property type is an identified vehicle type, and the property match indication is a vehicle match indication. The vehicle may be an automotive vehicle, the reported vehicle type may include a make and model of the automotive vehicle, and the identified vehicle type may include a make and model of the automotive vehicle. The property 151 may be property of the user 130, who may be insured by an insurance company. The insured user may be the claimant making a claim. Alternatively, the property 151 may be the property of a person other than an insured, such as a claimant of property damages at the crash site 150 who is not the insured but who has a claim against the insured. By way of example and not as a limitation, the vehicle type of the vehicle 154 may be identified as a TOYOTA AVALON belonging to the user 130 who is the insured. The reported vehicle type of the vehicle 154 for the user 130 on file may be a TOYOTA AVALON, and the identified vehicle type may thus match the reported vehicle type of the vehicle 154 on file. Similarly, an identified vehicle type of the vehicle 152 belonging to a claimant other than the insured may be identified as a make and model of an ACURA ZDX, and may match the reported vehicle type of the vehicle 152 having a make and model an ACURA ZDX. In other embodiments, only a make of a vehicle is utilized for such vehicle match identification and not a model of the vehicle. In an embodiment in which one or more vehicles on the claim (e.g., as the reported vehicles) are of the same make and model (or same make alone), the intelligent prediction system 200 may default to routing the total loss determination to another determination source, such as a human specialist. In other embodiments when one or more vehicles 152, 154 on the claim (e.g., as the reported vehicle) are of the same make and model (or same make alone) and the user 130 as the owner of one of the vehicles 152, 154 uploads a photo of the user owned vehicle with a label of "my vehicle exterior," and the photo is of acceptable quality for use as determined by the module 300 of the intelligent prediction system 200, the photo may be utilized by the intelligent prediction system 200 to automate the total loss determination as described herein based on an assumption that the user 130 accurately labeled the user owned vehicle for appropriate vehicle identification and matching.

When no such match is otherwise determined, such as when the property is a vehicle, and the identified vehicle is not a vehicle that has been reported to the system and is thus not stored in the system as associated with a claim, the system may route the claim to a human specialist for further review and/or a manual total loss determination. When such a match is determined, however, the instructions may be to generate an automated predicted total loss determination based on the total loss score, the one or more processed images from the data analytics module, and the property match indication. The automated predicted total loss determination based on the total loss score, the one or more processed images from the data analytics module, and the property match indication may be configured to compare and combine structured data associated with the claim with analyzed image data to obtain consolidated results for a more accurate total loss determination. As a non-limiting example, images showing a severity of damage may not provide information about damage to a mechanical part that is provided by the structured data. A blend of the combined data such as inserting the total loss score from the structured data model into a convolutional neural network of the intelligent prediction system 200 analyzing the processed images may reduce system noise and produces efficient results and a more accurate total loss score. The automated predicted total loss determination may cause a scheduled inspection to be canceled and reduced the amount of time a vehicle is held at a garage, saving time and expenses related to the estimation process.

Total losses associated with property, such as insured property, that are reported to an insurance company for processing may be numerous in volume, expensive to process, and may be an unpleasant experience for the parties involved. A manual total loss determination for an insurance claim may take longer than a week for a human specialist at an insurance company to determine. However, with the tools, systems, and methods described herein to automate one or more aspects of the total loss determination process, this time frame can be significantly shortened for a large proportion of submitted insurance claims.

In embodiments, the intelligent prediction solution systems and methods as described herein assist to significantly reduce inefficiencies associated with claims processing, and may reduce such volume of reported losses for processing, by efficiently handling total loss determinations in a first instance to result in faster total loss identification, for example. As a non-limiting example, such requests may be received via application tools 226, such as through chats or digital interactions from a mobile or web-based application tool to provide a customized and personalized user experience independent of manual total loss determination process conducted by a human claims adjustor specialist. In an embodiment, the intelligent prediction solution systems and methods perform logic in real-time or near real-time for automatic generation of a total loss prediction as described herein. The intelligent prediction solution systems and methods provide a more efficient processing system to efficiently and automatically handle total loss determinations, effectively reducing a use of processing power while optimizing system usage and efficiencies, while further improving customer and/or user experience and lowering rental or storage costs associated with the insured property and shortening the time to produce related total loss determinations.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing

Aspect 1. An intelligent prediction system including one or more processors, one or more memory components communicatively coupled to the one or more processors, and machine readable instructions stored in the one or more memory components. The machine readable instructions cause the intelligent prediction system to perform at least the following when executed by the one or more processors: receive from a user one or more uploaded and labeled images of at least a property and a claim identifier associated with the property; retrieve information based on the claim identifier, wherein the information includes a total loss score of the property and a reported property type of the property; analyze the one or more uploaded and labeled images to generate one or more processed images via a data analytics module; determine an identified property type of the property from the one or more processed images; generate a property match indication between the identified property type determined from the one or more processed images and the reported property type associated with the claim identifier when there is a match therebetween; and generate an automated predicted total loss determination based on the total loss score, the one or more processed images from the data analytics module, and the property match indication.

Aspect 2. The intelligent prediction system of Aspect 1, wherein the property is a vehicle, the reported property type is a reported vehicle type, the identified property type is an identified vehicle type, and the property match indication is a vehicle match indication.

Aspect 3. The intelligent prediction system of Aspect 2, wherein the vehicle is an automotive vehicle, the reported vehicle type includes a make and model of the automotive vehicle, and the identified vehicle type includes a make and model of the automotive vehicle.

Aspect 4. The intelligent prediction system of any of Aspects 1-3, wherein the property is a property of the user.

Aspect 5. The intelligent prediction system of Aspect 4, wherein the user is an insured.

Aspect 6. The intelligent prediction system of any of Aspects 1-4, wherein the property is a property of a person other than an insured.

Aspect 7. The intelligent prediction system of Aspect 6, wherein the person other than the insured is a claimant.

Aspect 8. The intelligent prediction system of any of Aspects 1-7, wherein the one or more uploaded and labeled images are configured to be labeled based one or more pre-determined labels including one of: "front," "rear," "driver side," "passenger side," and "not vehicle," and each labeled image comprises a pre-determined label of "not vehicle" is not processed to generate the one or more processed images.

Aspect 9. The intelligent prediction system of any of Aspects 1-8, wherein the one or more uploaded and labeled images are configured to be labeled based on one or more pre-determined classes.

Aspect 10. The intelligent prediction system of Aspect 9, wherein the one or more pre-determined classes include one of: front, rear, driver side, passenger side, driver side front corner, passenger side front corner, driver side rear corner, passenger side rear corner, zoomed in, and not vehicle.

Aspect 11. The intelligent prediction system of Aspect 9, wherein when the one or more pre-determined classes includes driver side front corner, the one or more pre-determined classes further includes a sub-class including one of: front visible, driver side visible, front and driver side visible.

Aspect 12. The intelligent prediction system of Aspect 9, wherein when the one or more pre-determined classes includes passenger side front corner, the one or more pre-determined classes further includes a sub-class including one of: front visible, passenger side visible, front and passenger side visible.

Aspect 13. The intelligent prediction system of Aspect 9, wherein when the one or more pre-determined classes includes driver side rear corner, the one or more pre-determined classes further including a sub-class including one of: rear visible, driver side visible, rear and driver side visible.

Aspect 14. The intelligent prediction system of Aspect 9, wherein when the one or more pre-determined classes includes passenger side rear corner, the one or more pre-determined classes further includes a sub-class including one of: rear visible, passenger side visible, rear and passenger side visible.

Aspect 15. The intelligent prediction system of any of Aspects 1-9, further including machine readable instructions that cause the intelligent prediction system to perform at least the following when executed by the one or more processors: filter the uploaded and labeled images to determine one or more usable filtered images; and analyze the one or more usable filtered images to generate the one or more processed images via the data analytics module.

Aspect 16. A method of implementing an intelligent prediction system to automatically generate a total loss prediction, the method including: receiving from a user one or more uploaded and labeled images of at least a property and a claim identifier associated with the property; retrieving information based on the claim identifier, wherein the information includes a total loss score of the property and a reported property type of the property; analyzing the one or more uploaded and labeled images to generate one or more processed images via a data analytics module; determining an identified property type of the property from the one or more processed images; generating a property match indication between the identified property type determined from the one or more processed images and the reported property type associated with the claim identifier when there is a match therebetween; and generating an automated predicted total loss determination based on the total loss score, the one or more processed images from the data analytics module, and the property match indication.

Aspect 17. The method of Aspect 16, further including: filtering the uploaded and labeled images to determine one or more usable filtered images; and analyzing the one or more usable filtered images to generate the one or more processed images via the data analytics module. The property is a vehicle, the reported property type is a reported vehicle type, the identified property type is an identified vehicle type, and the property match indication is a vehicle match indication.

Aspect 18. The method of any of Aspects 16-17, further including labeling the one or more uploaded and labeled images based on one or more pre-determined classes.

Aspect 19. A method of implementing an intelligent prediction system to automatically generate a total loss prediction, the method including: receiving from a user one or more uploaded and labeled images of at least a vehicle that is an automotive vehicle and a claim identifier associated with the vehicle; retrieving information based on the claim identifier, wherein the information includes a total loss score of the vehicle and a reported vehicle type of the vehicle; analyzing the one or more uploaded and labeled images to generate one or more processed images via a data analytics module; determining an identified vehicle type of the vehicle from the one or more processed images; generating a vehicle match indication between the identified vehicle type determined from the one or more processed images and the reported vehicle type associated with the claim identifier when there is a match therebetween; and generating an automated predicted total loss determination based on the total loss score, the one or more processed images from the data analytics module, and the vehicle match indication.

Aspect 20. The method of Aspect 19, further including: filtering the uploaded and labeled images to determine one or more usable filtered images; and analyzing the one or more usable filtered images to generate the one or more processed images via the data analytics module.

What is claimed is:

1. An intelligent prediction system comprising:
   one or more processors;
   one or more memory components communicatively coupled to the one or more processors; and
   machine readable instructions stored in the one or more memory components that cause the intelligent prediction system to perform at least the following when executed by the one or more processors:
      receive from a user one or more uploaded and labeled images of at least a property and a claim identifier associated with the property;
      retrieve information based on the claim identifier, wherein the information comprises a total loss score of the property and a reported property type of the property;
      filter, via an artificial intelligence model of a data analytics module, the uploaded and labeled images to determine one or more usable filtered images and one or more unusable images;
      discard the one or more unusable images;
      analyze the one or more usable filtered images of the one or more uploaded and labeled images to generate one or more processed images based on the one or more usable filtered images via the artificial intelligence model of the data analytics module such that the one or more processed images exclude the one or more unusable images that are discarded;
      determine an identified property type of the property from the one or more processed images;
      generate a property match indication between the identified property type determined from the one or more processed images generated based on the one or more usable filtered images and the reported property type associated with the claim identifier when there is a match therebetween; and
      generate an automated predicted total loss determination based on the total loss score, the one or more processed images from the data analytics module generated based on the one or more usable filtered images, and the property match indication, without allowing generation of the automated predicted total loss determination when the property match indication is not generated such as when there is not a match between the identified property type determined from the one or more processed images and the reported property type associated with the claim identifier.

2. The intelligent prediction system of claim 1, wherein the property comprises a vehicle, the reported property type comprises a reported vehicle type, the identified property type comprises an identified vehicle type, and the property match indication comprises a vehicle match indication.

3. The intelligent prediction system of claim 2, wherein the vehicle is an automotive vehicle, the reported vehicle type comprises a make and model of the automotive vehicle, and the identified vehicle type comprises a make and model of the automotive vehicle.

4. The intelligent prediction system of claim 1, wherein the property comprises a property of the user.

5. The intelligent prediction system of claim 4, wherein the user comprises an insured.

6. The intelligent prediction system of claim 1, wherein the property comprises a property of a person other than an insured.

7. The intelligent prediction system of claim 6, wherein the person other than the insured comprises a claimant.

8. The intelligent prediction system of claim 1, wherein the one or more uploaded and labeled images are configured to be labeled by the system based one or more pre-determined labels comprising one of: "front," "rear," "driver side," "passenger side," and "not vehicle," and each labeled image comprises a pre-determined label of "not vehicle" is not processed to generate the one or more processed images.

9. The intelligent prediction system of claim 1, wherein the one or more uploaded and labeled images are configured to be labeled based on one or more pre-determined classes.

10. The intelligent prediction system of claim 9, wherein the one or more pre-determined classes comprise one of: front, rear, driver side, passenger side, driver side front corner, passenger side front corner, driver side rear corner, passenger side rear corner, zoomed in, and not vehicle.

11. The intelligent prediction system of claim 9, wherein when the one or more pre-determined classes comprises driver side front corner, the one or more pre-determined classes further comprises a sub-class comprising one of: front visible, driver side visible, front and driver side visible.

12. The intelligent prediction system of claim 9, wherein when the one or more pre-determined classes comprises passenger side front corner, the one or more pre-determined classes further comprises a sub-class comprising one of: front visible, passenger side visible, front and passenger side visible.

13. The intelligent prediction system of claim 9, wherein when the one or more pre-determined classes comprises driver side rear corner, the one or more pre-determined classes further comprises a sub-class comprising one of: rear visible, driver side visible, rear and driver side visible.

14. The intelligent prediction system of claim 9, wherein when the one or more pre-determined classes comprises passenger side rear corner, the one or more pre-determined classes further comprises a sub-class comprising one of: rear visible, passenger side visible, rear and passenger side visible.

15. A method of implementing an intelligent prediction system to automatically generate a total loss prediction, the method comprising:
- receiving from a user one or more uploaded and labeled images of at least a property and a claim identifier associated with the property;
- retrieving information based on the claim identifier, wherein the information comprises a total loss score of the property and a reported property type of the property;
- filtering, via an artificial intelligence model of a data analytics module, the uploaded and labeled images to determine one or more usable filtered images and one or more unusable images;
- discarding the one or more unusable images;
- analyzing the one or more usable filtered images of the one or more uploaded and labeled images to generate one or more processed images based on the one or more usable filtered images via the artificial intelligence model of the data analytics module the artificial intelligence model of the data analytics module such that the one or more processed images exclude the one or more unusable images that are discarded;
- determining an identified property type of the property from the one or more processed images;
- generating a property match indication between the identified property type determined from the one or more processed images generated based on the one or more usable filtered images and the reported property type associated with the claim identifier when there is a match therebetween; and
- generating an automated predicted total loss determination based on the total loss score, the one or more processed images from the data analytics module generated based on the one or more usable filtered images, and the property match indication, without allowing generation of the automated predicted total loss determination when the property match indication is not generated such as when there is not a match between the identified property type determined from the one or more processed images and the reported property type associated with the claim identifier.

16. The method of claim 15,
wherein the property comprises a vehicle, the reported property type comprises a reported vehicle type, the identified property type comprises an identified vehicle type, and the property match indication comprises a vehicle match indication.

17. The method of claim 16, further comprising labeling the one or more uploaded and labeled images based on one or more pre-determined classes.

18. A method of implementing an intelligent prediction system to automatically generate a total loss prediction, the method comprising:
- receiving from a user one or more uploaded and labeled images of at least a vehicle that is an automotive vehicle and a claim identifier associated with the vehicle;
- retrieving information based on the claim identifier, wherein the information comprises a total loss score of the vehicle and a reported vehicle type of the vehicle;
- filtering, via an artificial intelligence model of a data analytics module, the uploaded and labeled images to determine one or more usable filtered images and one or more unusable images;
- discarding the one or more unusable images;
- analyzing the one or more usable filtered images of the one or more uploaded and labeled images to generate one or more processed images based on the one or more usable filtered images via the artificial intelligence model of the data analytics module the artificial intelligence model of the data analytics module such that the one or more processed images exclude the one or more unusable images that are discarded;
- determining an identified vehicle type of the vehicle from the one or more processed images;
- generating a vehicle match indication between the identified vehicle type determined from the one or more processed images generated based on the one or more usable filtered images and the reported vehicle type associated with the claim identifier when there is a match therebetween; and
- generating an automated predicted total loss determination based on the total loss score, the one or more processed images from the data analytics module generated based on the one or more usable filtered images, and the vehicle match indication, without allowing generation of the automated predicted total loss determination when the vehicle match indication is not generated such as when there is not a match between the identified vehicle type determined from the one or more processed images and the reported vehicle type associated with the claim identifier.

\* \* \* \* \*